US008918546B2

(12) United States Patent
Cheah et al.

(10) Patent No.: US 8,918,546 B2
(45) Date of Patent: Dec. 23, 2014

(54) APPARATUS AND METHOD FOR ENABLING DIGITAL AND ANALOG DATA COMMUNICATION OVER A DATA BUS (75) Inventors: Sin Hui Cheah, Carmel, IN (US); Ronald Alexander Fleming, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 980 days.

(21) Appl. No.: 11/659,773

(22) PCT Filed: Aug. 4, 2005

(86) PCT No.: PCT/US2005/027724
§ 371 (c)(1),
(2), (4) Date: Feb. 8, 2007

(87) PCT Pub. No.: WO2006/026054
PCT Pub. Date: Mar. 9, 2006

(65) Prior Publication Data
US 2008/0228969 A1    Sep. 18, 2008

Related U.S. Application Data (60) Provisional application No. 60/605,296, filed on Aug. 27, 2004.

(51) Int. Cl.
*G06F 3/00* (2006.01)
*G06F 13/12* (2006.01)
*G06F 13/38* (2006.01)

(52) U.S. Cl.
CPC ................... *G06F 13/385* (2013.01)
USPC ............................... 710/14; 710/69

(58) Field of Classification Search
None
See application file for complete search history.

(56) References Cited

U.S. PATENT DOCUMENTS 5,428,752 A   6/1995  Goren et al.
6,013,108 A   1/2000  Karolys et al.
6,901,142 B1  5/2005  Peters et al.

(Continued)

FOREIGN PATENT DOCUMENTS

CN    2599648 Y    1/2004
CN    1473451 A    2/2004

(Continued)

OTHER PUBLICATIONS

Definition of "field-effect transistor", Aug. 8, 2000, http://searchcio-midmarket.techtarget.com/sDefinition/0,,sid183_gci213961,00.html.*

(Continued)

*Primary Examiner* — Kris Rhu
(74) *Attorney, Agent, or Firm* — Robert D. Shedd; Reitseng Lin (57) ABSTRACT An electronic apparatus such as an audio apparatus enables both digital and analog data to be communicated over a data bus such as a universal serial bus (USB) with a single low-cost connector such as a USB connector. According to an exemplary embodiment, the electronic apparatus includes a connector operative to couple the electronic apparatus to one of a digital device and an analog device. A controller is operative to determine whether the connector is coupled to the digital device or the analog device. A switch is operative to couple the connector to one of a digital element and an analog element responsive to the determination.

30 Claims, 4 Drawing Sheets

(56) References Cited

U.S. PATENT DOCUMENTS

| | | | |
|---|---|---|---|
| 7,039,201 B1* | 5/2006 | Lee et al. | 381/97 |
| 2003/0097501 A1* | 5/2003 | Young | 710/69 |
| 2003/0172209 A1 | 9/2003 | Liu et al. | |
| 2004/0096073 A1 | 5/2004 | Kim | |
| 2004/0133734 A1* | 7/2004 | Jordan et al. | 711/103 |
| 2004/0160993 A1* | 8/2004 | Ganton et al. | 370/537 |
| 2005/0177661 A1* | 8/2005 | Loo | 710/72 |
| 2006/0053239 A1* | 3/2006 | Zheng et al. | 710/72 |

FOREIGN PATENT DOCUMENTS

| | | |
|---|---|---|
| EP | 0 655 692 A2 | 5/1995 |
| JP | 59039110 | 3/1984 |
| JP | 10-65774 | 3/1998 |
| JP | 10-199153 | 7/1998 |
| JP | 2000172484 | 6/2000 |
| JP | 2000324088 | 11/2000 |
| JP | 2000341387 | 12/2000 |
| JP | 2001053826 | 2/2001 |
| JP | 2002-50978 | 2/2002 |
| JP | 2002-351496 | 12/2002 |
| JP | 2004-38377 | 2/2004 |
| KR | 2001010506 | 2/2001 |
| KR | 20011716 | 12/2001 |
| KR | 2003094926 | 12/2003 |
| WO | WO0104739 | 2/2001 |
| WO | WO 01/37585 A2 | 5/2001 |
| WO | 2004/060155 A1 | 7/2004 |

OTHER PUBLICATIONS

European Search Report.

* cited by examiner

APPARATUS AND METHOD FOR ENABLING DIGITAL AND ANALOG DATA COMMUNICATION OVER A DATA BUS

CROSS REFERENCE TO RELATED APPLICATION

This application claims the benefit, under 35 U.S.C. §365 of International Application PCT/US2005/027724, filed Aug. 4, 2005 which was published in accordance with PCT Article 21(2) on Mar. 9, 2006 in English and which claims the benefit of U.S. provisional patent application No. 60/605,296 filed Aug. 27, 2004.

BACKGROUND OF THE INVENTION

1. Field of the Invention

The present invention generally relates to data communications, and more particularly, to an apparatus and method for enabling, among other things, both digital and analog data to be communicated over a data bus such as a universal serial bus (USB) with a single low-cost connector such as a USB connector.

2. Background Information

Data communication over a bus is generally known in the art. One well-known type of bus is the USB, which is generally used to transmit digital data between apparatuses/devices. Accordingly, many apparatuses/devices such as audio/MP3 players, computers, peripheral equipment and other devices often include a connector/jack for connecting to a USB.

With an audio apparatus/device such as an MP3 player, for example, it is desirable to provide a means by which digital audio data can be received, and also by which analog audio data can be output to another device. One approach to accommodate both digital and analog data in this manner is to provide separate electrical connectors for the two different types of data. For example, the digital data may be received via a USB connector and the analog data may be output via another connector. Another approach is to use a connector that is physically larger than a typical USB connector. These approaches, however, are both deficient in that they may significantly increase product cost.

Accordingly, there is a need for an apparatus and method which addresses the foregoing problems, and thereby enables both digital and analog data to be communicated over a data bus such as a USB with a single low-cost connector such as a USB connector. The present invention addresses these and/or other issues.

SUMMARY OF THE INVENTION

In accordance with an aspect of the present invention, an electronic apparatus is disclosed. According to an exemplary embodiment, the electronic apparatus comprises interface means for coupling the electronic apparatus to one of a digital device and an analog device. Control means determines whether the interface means is coupled to the digital device or the analog device. Switching means couples the interface means to one of a digital element and an analog element responsive to the determination.

In accordance with another aspect of the present invention, a method for controlling an electronic apparatus is disclosed. According to an exemplary embodiment, the method comprises detecting if a connector of the electronic apparatus is in a connected state, determining whether the connector is coupled to a digital device or an analog device if the connector is in the connected state, and coupling the connector to one of a digital element and an analog element of the electronic apparatus responsive to the determination.

In accordance with another aspect of the present invention, an audio apparatus is disclosed. According to an exemplary embodiment, the audio apparatus comprises a connector operative to couple the audio apparatus to one of a digital device and an analog device. A controller is operative to determine whether the connector is coupled to the digital device or the analog device. A switch is operative to couple the connector to one of a digital element and an analog element responsive to the determination.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
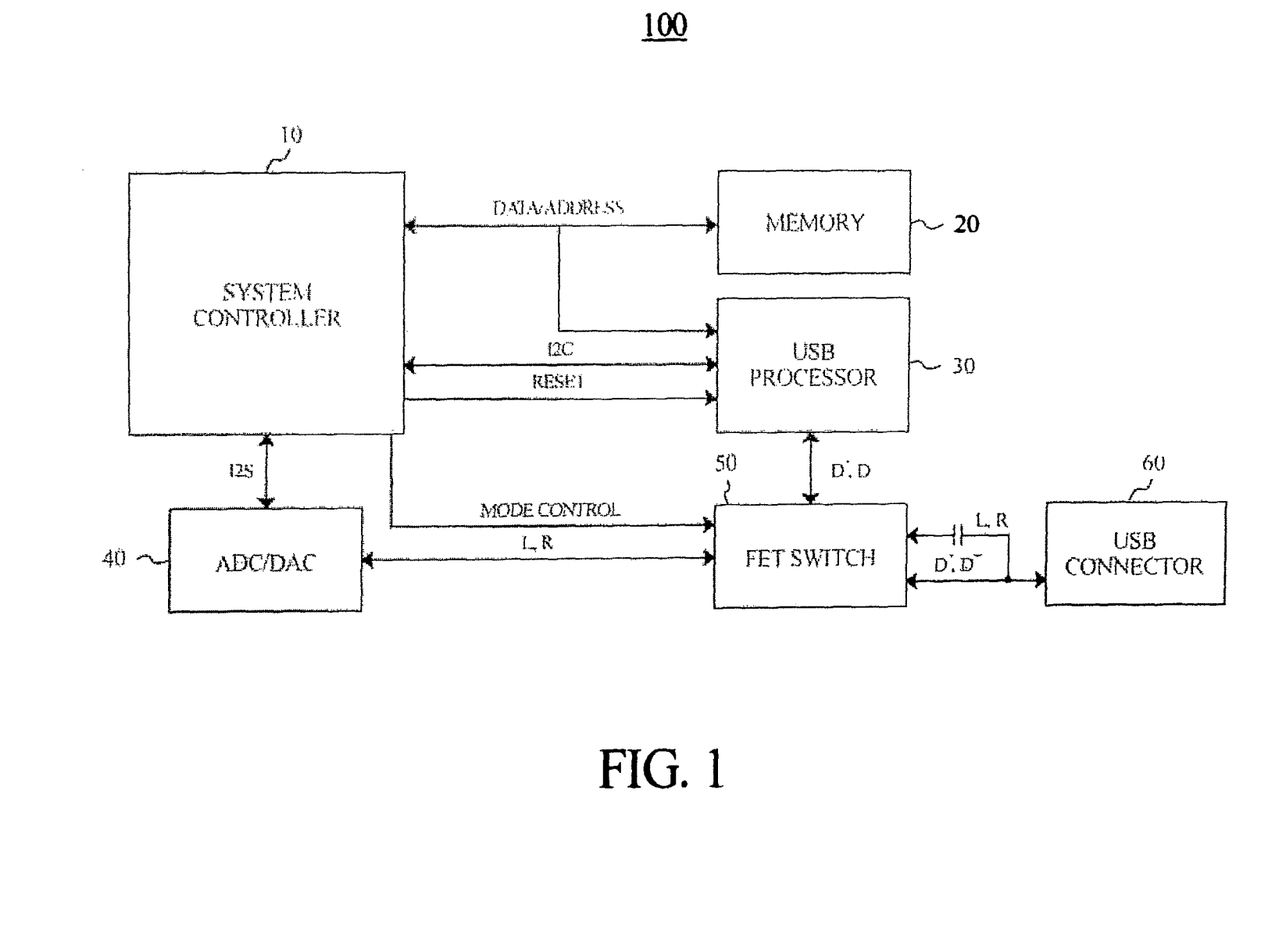
FIG. 1 is a block diagram of an electronic apparatus according to an exemplary embodiment of the present invention.

Referring now to the drawings, and more particularly to FIG. 1, a block diagram of an electronic apparatus 100 according to an exemplary embodiment of the present invention is shown. According to an exemplary embodiment, electronic apparatus 100 is embodied as an audio apparatus such as RCA model RD2765 MP3 player, but may be embodied as another type of electronic device or apparatus. Electronic apparatus 100 comprises control means such as system controller 10, memory means such as memory 20, processing means such as USB processor 30, data conversion means such as analog-to-digital converter (ADC) and/or digital-to-analog converter (DAC) 40, switching means such as field effect transistor (FET) switch 50, and interface means such as USB connector 60. Some of the foregoing elements of FIG. 1 may be embodied using integrated circuits (ICs), and some elements may be included on one or more ICs. For example, in certain designs, system controller 10, USB processor 30, and ADC/DAC 40 may be implemented in a single IC. For clarity of description, certain conventional elements associated with electronic apparatus 100 such as certain control signals, power signals and/or other elements may not be shown in FIG. 1.

System controller 10 is operative to perform various control and processing functions. According to an exemplary embodiment, system controller 10 is operative to read digital audio data from memory 20 via a data/address bus (e.g., responsive to a user input) and decode this digital audio data (e.g., MP3 decoding, etc.) to thereby generate decoded digital audio data. This decoded digital audio data is then serially provided to DAC 40 via an inter-integrated sound ("I2S") bus. System controller 10 may also receive digital audio data from ADC 40, process the received digital audio data, and cause the processed digital audio data to be stored in memory 20. System controller 10 is also operative to control a reset state of USB processor 30. According to an exemplary embodiment, system controller 10 provides a reset signal to USB processor 30 having a logic state indicating the reset state. For example, the reset signal may exhibit a logic state of "0" (or vice-versa) when USB processor 30 is in the reset state, and may exhibit a logic state of "1" (or vice-versa) when USB processor 30 is released from the reset state.

Figure 2:
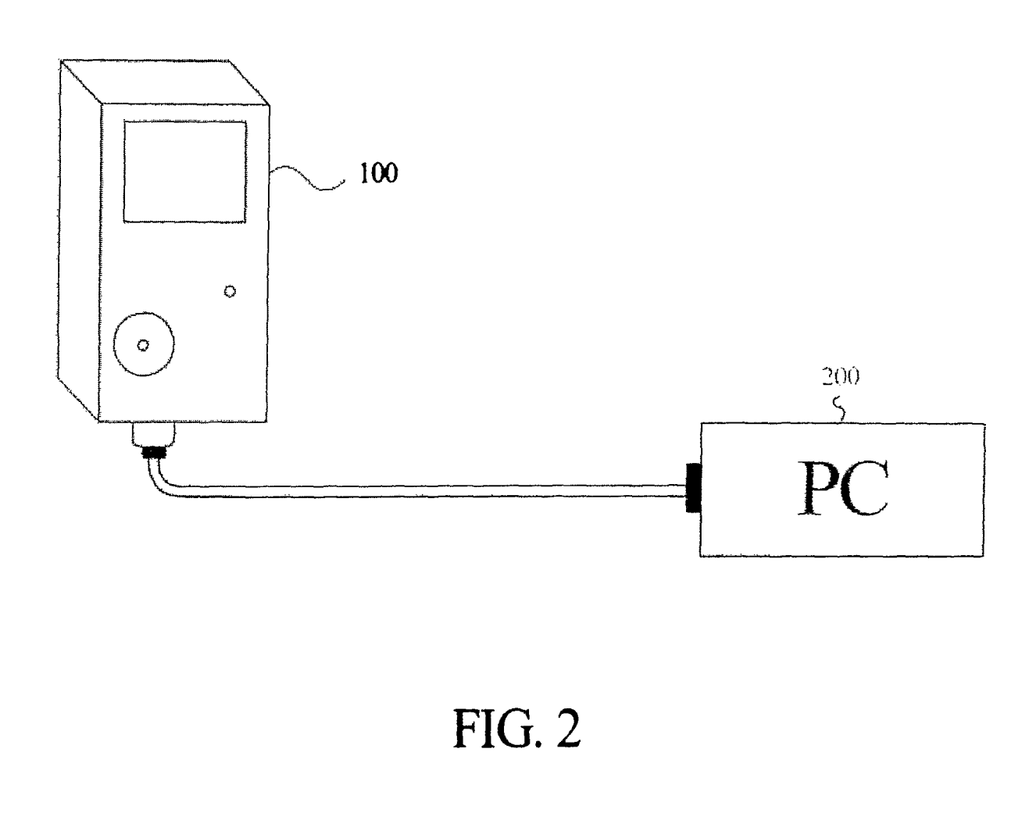
FIG. 2 is a diagram of the electronic apparatus of FIG. 1 in a digital mode according to an exemplary embodiment of the present invention.
Figure 3:
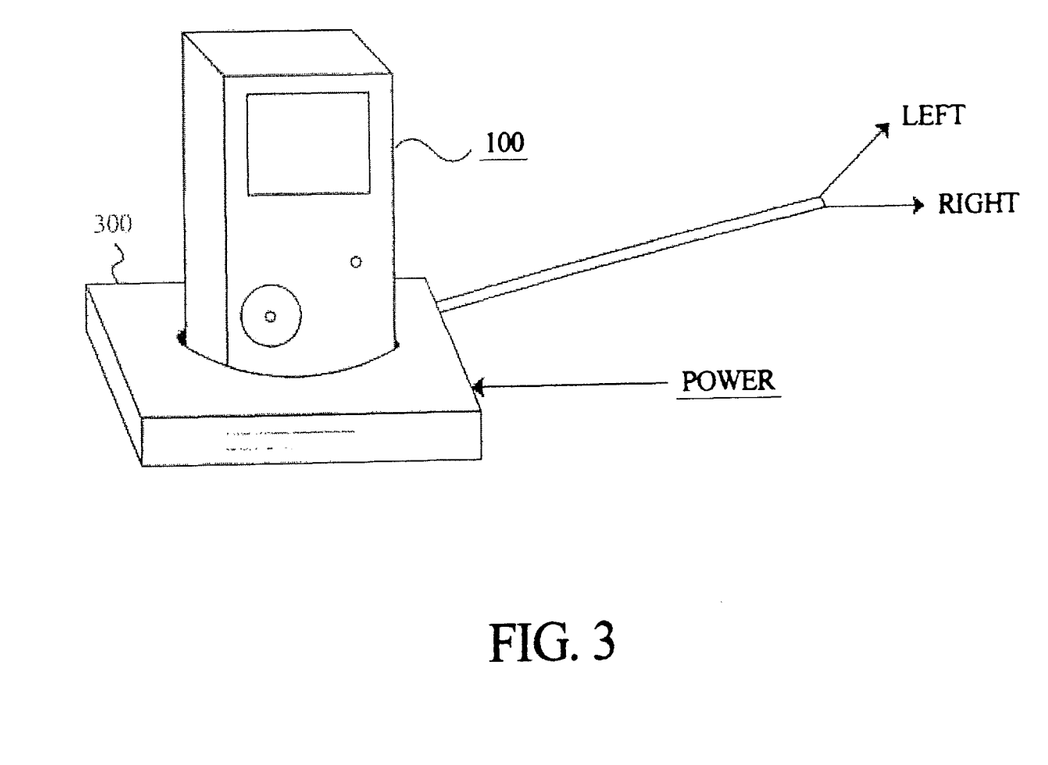
FIG. 3 is a diagram of the electronic apparatus of FIG. 1 in an analog mode according to an exemplary embodiment of the present invention.

System controller 10 is also operative to control an operating mode of electronic apparatus 100. According to an exemplary embodiment, electronic apparatus 100 includes a digital mode and an analog mode. During the digital mode, electronic apparatus 100 is operative to receive, process and store digital data including digital audio data provided from an external digital device such as a personal computer (PC). Electronic apparatus 100 may also output such digital data to an external digital device during the digital mode. FIG. 2 is a diagram showing electronic apparatus 100 connected to a PC 200 via a data bus such as a USB in the digital mode according to an exemplary embodiment of the present invention. During the analog mode, electronic apparatus 100 is operative to receive analog data such as analog audio data from an external analog device, convert the received analog data to a digital format, and store the resulting digital data. Electronic apparatus 100 may also convert stored digital data such as digital audio data to an analog format, and output the resulting analog data to an external analog device such as a docking station during the analog mode. FIG. 3 is a diagram showing electronic apparatus 100 connected to a docking station 300 in the analog mode according to an exemplary embodiment of the present invention. As indicated in FIG. 3, docking station 300 may provide left and right analog audio signals to one or more output elements (e.g., speakers) via a data bus such as a USB. As indicated in FIG. 1, system controller 10 provides a mode control signal to FET switch 50 to switch electronic apparatus 100 from the digital mode to the analog mode, and vice-versa.

System controller 10 is also operative to perform and/or enable other functions of electronic apparatus 100 as described herein. For example, system controller 10 loads enumeration code into USB processor 30 to facilitate identification of an external device connected to electronic apparatus 100 via USB connector 60. Although not expressly shown in FIG. 1, system controller 10 is also operatively coupled to at least one predetermined pin (e.g., pin 1) of USB connector 60, and is able to detect connected and disconnected states of USB connector 60 based on a voltage present on this predetermined pin. According to an exemplary embodiment, system controller 10 determines that USB connector 60 is in the connected state if a threshold voltage (e.g., 5 volts) is present on the predetermined pin. Conversely, system controller 10 determines that USB connector 60 is in the disconnected state if the threshold voltage is not present on the predetermined pin.

Memory 20 is operative to store digital data including digital audio data. According to an exemplary embodiment, memory 20 may be embodied as a non-volatile memory such as a static dynamic random access memory (SDRAM), flash memory, hard disc drive (HDD), or other type of memory.

USB processor 30 is operative to perform various USB-related processing functions. According to an exemplary embodiment, USB processor 30 performs data processing to enable data communication in accordance with the USB protocol. As is known in the art, the USB protocol includes simultaneously transmitting an original version of digital data (i.e., a D+ stream) and a complementary version of the same digital data (i.e., a D-stream). USB processor 30 is operative to convert such digital data received via FET switch 50 from a serial format to a parallel format prior to its storage in memory 20. Conversely, USB processor 30 is also operative to convert digital data read from memory 20 from a parallel format to a serial format prior to its output over a USB via USB connector 60. As will be described later herein, USB processor 30 is further operative to execute enumeration code to thereby identify a particular host device to which electronic apparatus 100 is connected.

ADC/DAC 40 is operative to handle analog data. In particular, ADC/DAC 40 is operative to convert data from an analog format to a digital format and/or vice-versa. That is, electronic apparatus 100 may include an ADC (and not a DAC), a DAC (and not an ADC), or both elements. According to an exemplary embodiment, ADC 40 receives left (L) and right (R) analog audio data from FET switch 50, and converts the received analog audio data to digital audio data. This digital audio data may then be processed via system controller 10 and stored in memory 20. Also according to an exemplary embodiment, DAC 40 receives decoded digital audio data in a serial manner from system controller 10 via the I2S bus, and converts the decoded digital audio data to analog audio data. As indicated in FIG. 1, this analog audio data may be provided as separate left (L) and right (R) analog audio signals.

FET switch 50 is operative to perform a switching function based on the mode control signal provided from system controller 10. According to an exemplary embodiment, FET switch 50 provides one or more input/output paths between USB processor 30 and USB connector 60 for digital data (e.g., digital audio data) during the digital mode. Conversely, FET switch 50 provides one or more input/output paths between ADC/DAC 40 and USB connector 60 for analog data (e.g., L and R audio data) during the analog mode. Also according to an exemplary embodiment, the analog data signal output from DAC 40 during the analog mode is floating on a direct current (DC) voltage that is approximately one half the applicable supply voltage. In this manner, signal excursion towards the negative potential is avoided. Conventional approaches for multiplexing analog and digital signals typically require switches that allow positive and negative excursion of analog signals in a strict manner. Such approaches, however, have serious limitations in that they are unable to pass higher speed digital signals (e.g., over 325 MHz), and are therefore unsuitable for multiplexing both digital and analog signals over a data bus such as a USB (e.g., version 2.0). Accordingly, the use of FET switch 50 is particularly advantageous since it allows switching between an analog signal and a high speed digital signal (e.g., 480 Mbps).

USB connector 60 is operative to connect electronic apparatus 100 to various external devices including digital devices such as PC 200 shown in FIG. 2, and analog devices such as docking station 300 shown in FIG. 3. As indicated in FIG. 1, the analog signal path between FET switch 50 and USB connector 60 includes one or more capacitors which filter the DC component of the analog data output from FET switch 50. According to an exemplary embodiment, USB connector 60 may be embodied as a mini-B type USB connector, a standard Type-B USB connector, or other type of connector. Table 1 below shows pin definitions for the mini-B type and standard Type-B USB connectors during the digital and analog modes of the present invention.

TABLE 1

| Pin Number | Mini-B Connector Digital Mode | Mini-B Connector Analog Mode | Type-B Connector Digital Mode | Type-B Connector Analog Mode |
|---|---|---|---|---|
| 1 | +5 V | +5 V | +5 V | +5 V |
| 2 | D− | Left Audio | D− | Left Audio |
| 3 | D+ | Right Audio | D+ | Right Audio |
| 4 | Identification | Identification | Ground | Ground |
| 5 | Ground | Ground | Not Available | Not Available |

Figure 4:
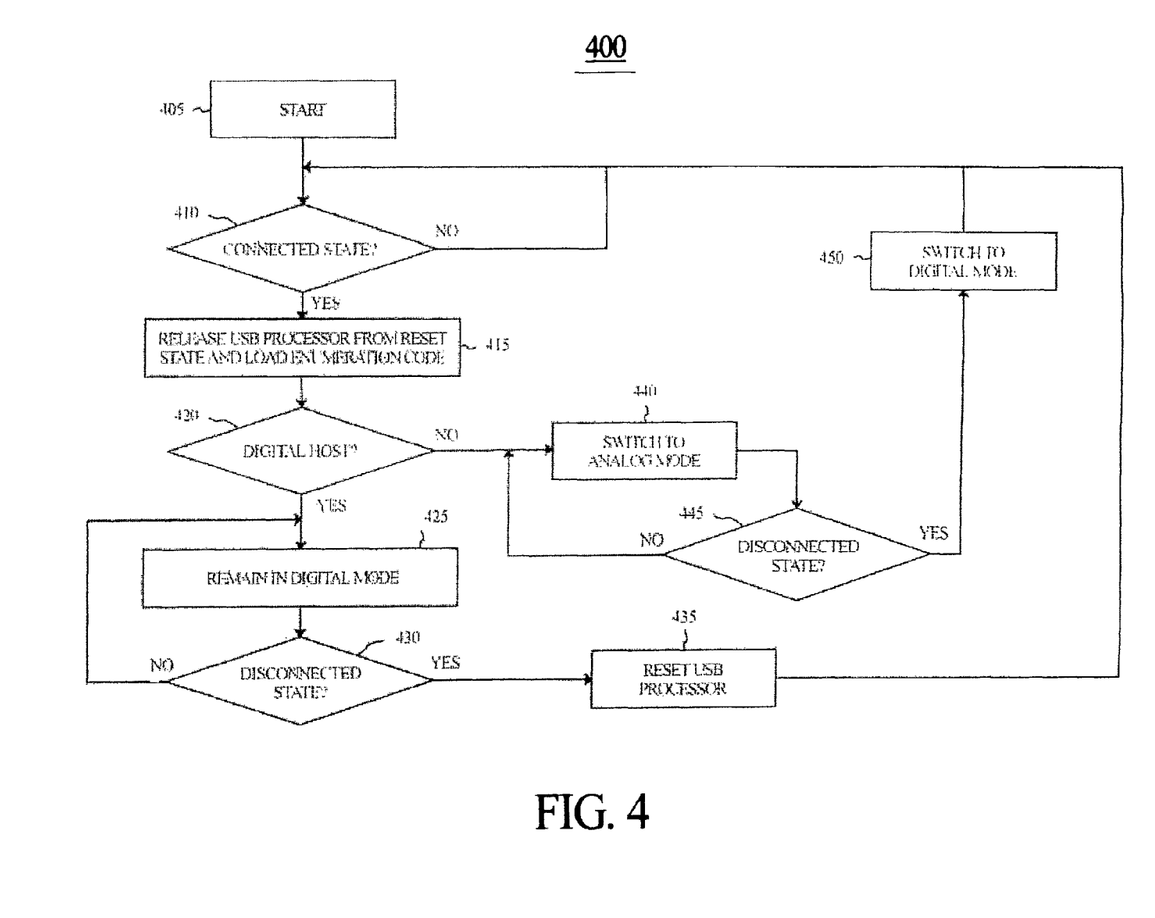
FIG. 4 is a flowchart illustrating steps for controlling an electronic apparatus according to an exemplary embodiment of the present invention.

Referring to FIG. 4, a flowchart 400 illustrating steps for controlling an electronic apparatus according to an exemplary embodiment of the present invention is shown. For purposes of example and explanation, the steps of FIG. 4 will be described with reference to electronic apparatus 100 shown in FIGS. 1 to 3. The steps of FIG. 4 are exemplary only, and are not intended to limit the present invention in any manner.

At step 405, the process starts. According to an exemplary embodiment, electronic apparatus 100 is in the digital mode when the process starts at step 405. At step 410, a determination is made as to whether USB connector 60 is in the connected state. According to an exemplary embodiment, system controller 10 makes the determination at step 410 by detecting whether a threshold voltage (e.g., 5 volts) is present on a predetermined pin (e.g., pin 1) of USB connector 60, which thereby indicates that USB connector 60 is in the connected state. As indicated in FIG. 4, step 410 is repeated until system controller 10 determines that USB connector 60 is in the connected state.

Once it is determined that USB connector 60 is in the connected state at step 410, process flow advances to step 415 where USB processor 30 is released from the reset state and enumeration code is loaded. According to an exemplary embodiment, system controller 10 changes the logic state of the reset signal (e.g., from "0" to "1" or vice-versa) provided to USB processor 30 to thereby release USB processor 30 from the reset state at step 415. System controller 10 also loads the enumeration code into USB processor 30 via the I2C bus at step 415. When executed, the enumeration code can enable USB processor 30 to identify the particular host device to which electronic apparatus 100 is connected.

At step 420, a determination is made as to whether the particular host device to which electronic apparatus 100 is connected is a digital device (e.g., PC, etc.). According to an exemplary embodiment, USB processor 30 executes the enumeration code at step 420 which initiates a "hand-shake" process with the host device connected to electronic apparatus 100. USB processor 30 provides any data received from the host device during this "hand-shake" process to system controller 10 via the I2C bus (or other digital data lines configured for such purpose), which thereby enables system controller 10 to determine whether the host device is a digital device at step 420.

If the determination at step 420 is positive, process flow advances to step 425 where electronic apparatus 100 remains in the digital mode. While in the digital mode, electronic apparatus 100 may receive digital data such as digital audio data from the digital host device, as represented for example in FIG. 2, and store the same in memory 20.

From step 425, process flow advances to step 430 where a determination is made as to whether USB connector 60 is in the disconnected state. As previously indicated herein, system controller 10 can determine whether USB connector 60 is in the connected or disconnected state by checking the voltage on a predetermined pin of USB connector 60. Accordingly, system controller 10 makes the determination at step 430 by checking the voltage on the predetermined pin of USB connector 60. As indicated in FIG. 4, steps 425 and 430 are repeated until system controller 10 determines that USB connector 60 is in the disconnected state.

Once it is determined that USB connector 60 is in the disconnected state at step 430, process flow advances to step 435 where USB processor 30 is reset. According to an exemplary embodiment, system controller 10 changes the logic state of the reset signal (e.g., from "1" to "0" or vice-versa) provided to USB processor 30 to thereby reset USB processor 30 at step 435. From step 435, process flow loops back to step 410 as indicated in FIG. 4.

Referring back to step 420, if the determination at step 420 is negative, process flow advances to step 440 where electronic apparatus 100 switches to the analog mode. According to an exemplary embodiment, system controller 10 provides the mode control signal to FET switch 50 to thereby switch electronic apparatus 100 from the digital mode to the analog mode at step 440. While in the analog mode, electronic apparatus 100 may output analog data such as analog audio data to an output device via a docking station, as represented for example in FIG. 3.

From step 440, process flow advances to step 445 where a determination is made as to whether USB connector 60 is in the disconnected state. As previously indicated herein, system controller 10 can determine whether USB connector 60 is in the connected or disconnected state by checking the voltage on a predetermined pin of USB connector 60. Accordingly, system controller 10 makes the determination at step 445 by checking the voltage on the predetermined pin of USB connector 60. As indicated in FIG. 4, steps 440 and 445 are repeated until system controller 10 determines that USB connector 60 is in the disconnected state.

Once it is determined that USB connector 60 is in the disconnected state at step 445, process flow advances to step 450 where electronic apparatus 100 switches back to the digital mode. According to an exemplary embodiment, system controller 10 provides the mode control signal to FET switch 50 to thereby switch electronic apparatus 100 from the analog mode to the digital mode at step 450. From step 450, process flow loops back to step 410 as indicated in FIG. 4.

As described herein, the present invention provides an apparatus and method for enabling, among other things, both digital and analog data to be communicated over a data bus such as a USB with a single low-cost connector such as a USB connector. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An electronic apparatus, comprising:
   interface means for coupling said electronic apparatus to one of a digital device during a digital mode of said electronic apparatus and an analog device during an analog mode of said electronic apparatus;
   control means for detecting when said interface means is in a connected state and coupled to one of said digital device and said analog device, and for detecting when said interface means is in a disconnected state and not coupled to said digital device or said analog device;

switching means for coupling said interface means to one of a digital processing unit of said electronic apparatus and an analog processing unit of said electronic apparatus responsive to a control signal from said control means; and memory means for storing digital data; and wherein:

during said digital mode, said interface means is in said connected state and digital signals are received from said digital device via said interface means and processed by said digital processing unit to generate said digital data, and said digital data is stored in said memory means;

during said analog mode, said interface means is in said connected state and said digital data is retrieved from said memory means and processed by said analog processing unit to generate analog signals, and said analog signals are output to said analog device via said interface means;

in response to said control means detecting said interface means is in said connected state, said control means causes said digital processing unit to initiate a communication process with an external device connected to said electronic apparatus via said interface means to determine if said external device is said digital device or said analog device;

in response to said control means determining that said external device is said digital device, said electronic apparatus operates in said digital mode;

in response to said control means determining that said external device is said analog device, said electronic apparatus operates in said analog mode; and in response to said control means detecting that said interface means is switched from said connected state to said disconnected state while said electronic apparatus is operating in said analog mode, said control means causes said electronic apparatus to switch to said digital mode.

2. The electronic apparatus of claim 1, wherein the electronic apparatus is a MP3 player.

3. The electronic apparatus of claim 1, wherein said interface means comprises a universal serial bus connector.

4. The electronic apparatus of claim 1, wherein said digital device and said analog device are external to the electronic apparatus.

5. The electronic apparatus of claim 4, wherein said digital device is a computer and said analog device is a docking station.

6. The electronic apparatus of claim 1, further comprising said digital processing unit and said analog processing unit.

7. The electronic apparatus of claim 1, wherein said digital processing unit comprises processing means for processing said digital signals provided from said digital device, and said memory means stores said processed digital signals.

8. The electronic apparatus of claim 7, wherein said digital signals provided from said digital device comprises digital audio data.

9. The electronic apparatus of claim 1, wherein:

said analog processing unit comprises a digital-to-analog converter for converting digital signals to analog signals; and said converted analog signals are provided to said analog device.

10. The electronic apparatus of claim 9, wherein said digital signals to be converted comprise digital audio data and said converted analog signals comprise audio signals.

11. The electronic apparatus of claim 1, wherein said switching means includes a field effect transistor that enables switching between a digital signal having a bit rate of at least 480 megabits per second and an analog signal.

12. The electronic apparatus of claim 1, further comprising capacitance means coupled between said switching means and said interface means for filtering an analog audio signal provided via said analog processing unit.

13. A method for controlling an electronic apparatus, said method comprising:

determining, via a controller of said electronic apparatus, when a connector of said electronic apparatus is in a connected state and coupled to one of a digital device and an analog device;

determining, via said controller, when said connector is in a disconnected state and not coupled to said digital device or said analog device;

coupling said connector to one of a digital processing unit of said electronic apparatus and an analog processing unit of said electronic apparatus responsive to a control signal from said controller, said connector being selectively coupled to said digital processing unit or said analog processing unit via a switch; and wherein:

during a digital mode of said electronic apparatus, said connector is in said connected state and digital signals are received from said digital device via said connector and processed by said digital processing unit to generate digital data, and said digital data is stored in a memory of said electronic apparatus;

during an analog mode of said electronic apparatus, said connector is in said connected state and said digital data is retrieved from said memory and processed by said analog processing unit to generate analog signals, and said analog signals are output to said analog device via said connector;

in response to said controller detecting that said connector is in said connected state, said controller causes said digital processing unit to initiate a communication process with an external device connected to said electronic apparatus via said connector to determine if said external device is said digital device or said analog device;

in response to said controller determining that said external device is said digital device, said electronic apparatus operates in said digital mode;

in response to said controller determining that said external device is said analog device, said electronic apparatus operates in said analog mode; and in response to said controller detecting that said connector is switched from said connected state to said disconnected state while said electronic apparatus is operating in said analog mode, said controller causes said electronic apparatus to switch to said digital mode.

14. The method of claim 13, wherein said connector comprises a universal serial bus connector.

15. The method of claim 13, wherein said digital device and said analog device are external to the electronic apparatus.

16. The method of claim 15, wherein said digital device is a computer and said analog device is a docking station.

17. The method of claim 13, wherein said analog processing unit comprises a digital-to-analog converter.

18. The method of claim 13, wherein said analog signals output to said analog device include audio content.

19. The method of claim 13, further comprising a step of filtering said analog signals before outputting said analog signals to said analog device via said connector.

20. The method of claim 13, wherein said switch includes a field effect transistor that enables switching between said digital signals having a bit rate of at least 480 megabits per second and analog signals.

21. An audio apparatus, comprising:
- a connector operative to couple said audio apparatus to one of a digital device during a digital mode of said audio apparatus and an analog device during an analog mode of said audio apparatus;
- a controller operative to detect when said connector is in a connected state and coupled to one of said digital device and said analog device, and for detecting when said connector is in a disconnected state and not coupled to said digital device or said analog device;
- a switch operative to couple said connector to one of a digital processing unit of said audio apparatus and an analog processing unit of said audio apparatus responsive to a control signal from said controller; and
- a memory operative to store digital data; and wherein:
- during said digital mode, said connector is in said connected state and digital signals are received from said digital device via said connector and processed by said digital processing unit to generate said digital data, and said digital data is stored in said memory;
- during said analog mode, said connector is in said connected state and said digital data is retrieved from said memory and processed by said analog processing unit to generate analog signals, and said analog signals are output to said analog device via said connector;
- in response to said controller detecting said connector in said connected state, said controller causes said digital processing unit to initiate a communication process with an external device connected to said audio apparatus via said connector to determine if said external device is said digital device or said analog device;
- in response to said controller determining that said external device is said digital device, said audio apparatus operates in said digital mode;
- in response to said controller determining that said external device is said analog device, said audio apparatus operates in said analog mode; and
- in response to said controller detecting that said connector is switched from said connected state to said disconnected state while said audio apparatus is operating in said analog mode, said controller causes said audio apparatus to switch to said digital mode.

22. The audio apparatus of claim 21, wherein said connector comprises a universal serial bus connector.

23. The audio apparatus of claim 22, wherein said digital device and said analog device are external to the audio apparatus.

24. The audio apparatus of claim 23, wherein said digital device is a computer and said analog device is a docking station.

25. The audio apparatus of claim 24, further comprising said digital processing unit and said analog processing unit.

26. The audio apparatus of claim 25, wherein said digital processing unit comprises a processor operative to process digital audio data provided from said digital device, and said memory is operative to store said processed digital audio data.

27. The audio apparatus of claim 26, wherein:
- said analog processing unit comprises a digital-to-analog converter for converting digital audio data to analog audio data; and
- said converted analog audio data is provided to said analog device.

28. The audio apparatus of claim 27, wherein said switch includes a field effect transistor that enables switching between a digital signal having a bit rate of at least 480 megabits per second and an analog signal.

29. The audio apparatus of claim 28, further comprising at least one capacitor coupled between said switch and said connector for filtering an analog audio signal provided via said analog processing unit.

30. The audio apparatus of claim 29, wherein said audio apparatus is a MP3 player.

* * * * *